(12) United States Patent
Contreras et al.

(10) Patent No.: US 9,806,944 B2
(45) Date of Patent: Oct. 31, 2017

(54) NETWORK CONTROLLER AND A COMPUTER IMPLEMENTED METHOD FOR AUTOMATICALLY DEFINE FORWARDING RULES TO CONFIGURE A COMPUTER NETWORKING DEVICE

(71) Applicant: Telefonica, S.A., Madrid (ES)

(72) Inventors: Luis Miguel Contreras, Madrid (ES); Diego R. Lopez, Madrid (ES); Antonio Agustin Pastor, Madrid (ES)

(73) Assignee: Telefonica, S.A., Madrid (ES)

( * ) Notice: Subject to any disclaimer, the term of this patent is extended or adjusted under 35 U.S.C. 154(b) by 99 days.

(21) Appl. No.: 14/940,429

(22) Filed: Nov. 13, 2015

(65) Prior Publication Data
US 2016/0142251 A1   May 19, 2016

(30) Foreign Application Priority Data
Nov. 14, 2014   (EP) .................... 14382453

(51) Int. Cl.
| | | |
|---|---|---|
| *H04L 12/24* | (2006.01) | |
| *H04L 12/721* | (2013.01) | |
| *H04L 29/12* | (2006.01) | |
| *H04L 29/06* | (2006.01) | |
| *H04L 12/715* | (2013.01) | |
| *H04L 12/717* | (2013.01) | |

(52) U.S. Cl.
CPC ...... *H04L 41/0806* (2013.01); *H04L 41/0803* (2013.01); *H04L 41/0813* (2013.01);
(Continued)

(58) Field of Classification Search
CPC ............ H04L 41/0803; H04L 41/0806; H04L 41/0813; H04L 41/0816; H04L 41/142;
(Continued)

(56) References Cited

U.S. PATENT DOCUMENTS

| | | | |
|---|---|---|---|
| 2014/0269724 A1* | 9/2014 | Mehler | .......... H04L 45/30 370/392 |
| 2015/0085694 A1* | 3/2015 | Agarwal | ......... H04L 43/04 370/253 |

(Continued)

FOREIGN PATENT DOCUMENTS

WO   2014/142278 A1   9/2014

OTHER PUBLICATIONS

H. Yin et al., "SDNi: A Message Exchange Protocol for Software Defined Networks (SDNS) across Multiple Domains", Internet Research Taskforce, Jun. 27, 2012, draft-yin-sdn-sdni-00.txt, pp. 1-14.

(Continued)

*Primary Examiner* — Le H Luu
(74) *Attorney, Agent, or Firm* — Sughrue Mion, PLLC (57) ABSTRACT

A network controller and a method for automatically define forwarding rules to configure a computer networking device, The network controller (100) is connected to a sub-network (A) of a communication network and comprises: a controller manager (101) that receives a request for a given service, defines forwarding rules related to said service and installs the defined forwarding rules into a computer networking device (120a) in order to configure it for said given service; a deciding module (102) configured to communicate with the controller manager (101) and configured to interact with a DNS server (150) to receive a determined resolution for a DNS request of said request for said given service, and with a database (300) to retrieve information supplementary for the DNS request, in order to assist the controller manager (101) in performing the defining of the forwarding rules; and a plurality of interfaces ($S_A$, $S_B$, $S_D$) for allowing the communication between the different elements.

15 Claims, 3 Drawing Sheets

(52) U.S. Cl.
CPC .......... *H04L 41/0816* (2013.01); *H04L 45/44* (2013.01); *H04L 45/64* (2013.01); *H04L 45/70* (2013.01); *H04L 61/1511* (2013.01); *H04L 63/0263* (2013.01); *H04L 45/04* (2013.01); *H04L 45/42* (2013.01); *H04L 61/1541* (2013.01)

(58) Field of Classification Search
CPC ....... H04L 41/145; H04L 45/64; H04L 45/70; H04L 45/42; H04L 45/44; H04L 45/04; H04L 45/30; H04L 45/38; H04L 45/66; H04L 45/7453; H04L 61/1511; H04L 43/04; H04L 67/16; H04W 28/0215; H04W 40/02
See application file for complete search history.

(56) References Cited

U.S. PATENT DOCUMENTS

| | | | |
|---|---|---|---|
| 2015/0124622 A1* | 5/2015 | Kovvali | H04W 28/0215 370/236 |
| 2015/0334595 A1* | 11/2015 | Bosch | H04L 29/06 370/235 |
| 2015/0372904 A1* | 12/2015 | Navon | H04L 45/38 709/238 |
| 2016/0036730 A1* | 2/2016 | Kutscher | H04L 45/38 370/401 |
| 2016/0112270 A1* | 4/2016 | Danait | H04L 41/142 709/220 |
| 2016/0127230 A1* | 5/2016 | Cui | H04W 40/02 370/389 |
| 2016/0173338 A1* | 6/2016 | Wolting | H04L 41/145 709/223 |
| 2016/0197831 A1* | 7/2016 | De Foy | H04L 45/7453 370/392 |
| 2016/0308981 A1* | 10/2016 | Cortes Gomez | H04L 67/16 |
| 2017/0171068 A1* | 6/2017 | Morper | H04L 45/66 |

OTHER PUBLICATIONS

European Search Report for EP 14 38 2453 dated Apr. 23, 2015.
"SDN architecture", ONF TR-502, Jun. 30, 2014, pp. 1-68, XP055182940, https://www.opennetworking.org/i mages/stories/downloads/sdn-resources/technical-reports/TR_SDN_Arch_1.0_06062014.pdf.

* cited by examiner

NETWORK CONTROLLER AND A COMPUTER IMPLEMENTED METHOD FOR AUTOMATICALLY DEFINE FORWARDING RULES TO CONFIGURE A COMPUTER NETWORKING DEVICE

CROSS-REFERENCE TO RELATED APPLICATIONS

This application claims priority based on European Patent Application No. 14 38 2453.0 filed Nov. 14, 2014, the contents of which are incorporated herein by reference in their entirety.

FIELD OF THE INVENTION

The present invention generally relates to data networks. In particular, the invention relates to a network controller and to a computer implemented method for automatically define forwarding rules to configure a computer networking device of a communication network. The proposed network controller, or improved Software-Defined Networking (SDN) controller, automatically and proactively configures on-demand the needed rules in the communication network for an effective communication and makes use of DNS capabilities to identify in advance the new flows that will pass through the communication network.

BACKGROUND OF THE INVENTION

The standard behavior of a SDN network controller implies the reactive configuration of forwarding rules for any new flow that does not match any existing entry in a flow table. The setup process for any new rule starts once a new packet arrives at a computer networking device such as a switch in case said switch does not contain any specific entry in the flow table. In that case, the switch sends a flow request to the SDN controller which analyses the packet for defining an applicable rule that is finally configured in the switch. The rules consist of an action (e.g. forward to a certain port, drop, send to the network controller, etc.) determined by a match or arbitrary bits in the packet header (e.g., MAC address, IP address, VLAN tag, TCP port, etc.).

The performance of this process depends on the switch and the SDN controller resources (CPU, memory, etc.) and can lead to a serious scalability issue, since the potential number of request to the network controller for a new rule is directly proportional to the number of distinct active flows in the communication network.

The SDN paradigm was originally conceived for efficient communication between virtual (or physical) machines residing in datacenter environments. In this environment the applications hosted in different devices communicates with each other to provide a certain service.

Nowadays the SDN concept is progressively gaining momentum and its application to conventional communication networks is envisaged. It is then needed to solve the potential scalability issues that central elements in a communication network could suffer (in this case, a SDN controller) due to the massive usage of the communication network by the end users.

Apart from that, Domain Name Service (DNS) is a standardized protocol and one of the basic services needed in today's Internet. Apart from name resolution service, DNS it has been extended several uses. One is the DNS-SD or DNS Service discovery [1] that was defined with the aim of simplified the network clients to discover and user offered service by the network like, browsing or printing. Another common use is a DNS-based request routing by Content Delivery Networks (CDNs) that resolve a different IP address of the CDN Server based in its own criteria. One typical scenario is using IP source geolocation to resolve different IP address of the content Server, trying to offer contents physically as closed as possible to the source resolving IP address.

Security Services based in DNS is another common practice. Fighting against spam and malware through a DNS-based Blackhole List (DNSBL) is a common practice.

As mentioned before, the reactive configuration of the switch by the network controller is the common behavior of an SDN network (as can be seen, for instance, in the OpenFlow specification [2]), which can lead to serious scalability issues. An example of a solution evolved from the OpenFlow specification is the OpenDayLight project [3]. It provides a REST API for its controller platform which may configure the DNS servers for a controller node. Another example of an evolved solution is the HP Sentinel [4] that only uses the SDN technology to receive DNS traffic and allow or not said DNS traffic by progressing the DNS request based on local rules. Therefore, said solution only allows progressing or not a user request after having compared it with a predefined list of rules.

On another hand, proactive configurations are implemented by network administrators directly specifying in the network controller flow policies without an actual knowledge of which flows will be created by the end user, then being generic, and not based on the real traffic that will pass through the network.

Apart from that, rules can change over time according to the network needs, and the memory in the switches is limited, so no fine-grain rules can be pre-configured for all the potential flows in the network.

Finally, in a telecommunication environment is more than probable that more than one network domain (sub-network) should be passed through the flow for setting and end-to-end communication. Then it is needed to establish a communication between SDN controllers across the entire network in order to preconfigure the flow rule in advance end-to-end.

REFERENCES

[1] RFC6763. DNS Service discovery.
[2] OpenFlow Switch Specification Version 1.3.0 (Wire Protocol 0x04) Jun. 25, 2012. https://www.opennetworking.org/images/stories/downloads/sdn-resources/onf-specifications/openflow/openflow-spec-v1.3.0.pdf
[3] http://www.opendaylight.org/project/technical-overview.
[4] http://h17007.www1.hp.com/docs/interopny/4AA4-3871ENW.pdf
[5] 3GPP TS 33.210. Network Domain Security (NDS).
[6] 3GPP TS 33.401. 3GPP System Architecture Evolution (SAE); Security architecture.
[7] https://datatracker.ietf.org/wg/sfc/charter/

DESCRIPTION OF THE INVENTION

Embodiments of the present invention address these and/or other needs by providing a network controller, such as a SDN controller, for automatically define forwarding rules to configure a computer networking device, for instance a switch. The network controller which is compliant with several Control to Data-Plane Interfaces (CDPI) specifications such as OpenFlow, among others, is connected to a sub-network of a communication network and comprises:

a controller manager that receives a request for a given service, and defines, by executing an algorithm, forwarding rules related to said service, and installs the defined forwarding rules into a computer networking device of the sub-network of the communication network in order to configure the computer networking device for said given service;

a deciding module configured to communicate with the controller manager and configured to interact with a DNS server to receive a determined resolution for a DNS request of said request for said given service, and with a database to retrieve information supplementary for the DNS request, in order to assist the controller manager in performing the defining of the forwarding rules; and a plurality of interfaces for respectively allowing the communication of the deciding module with the controller manager, the DNS server and the database.

In an embodiment the controller manager is connected to at least another computer networking device (for instance another switch) of said sub-network of the communication network in order to install the defined forwarding rules in said another computer networking device.

In another embodiment, the first network controller is connected to at least a second network controller of a different and adjacent sub-network of the communication network in order the deciding module of said first network controller sending, through a corresponding interface, the relevant information about the incoming request, or flow, in particular, the determined resolution received from the DNS server and the retrieved information from the database to at least another deciding module included in said second network controller.

According to the invention, the database includes: a reporting module for allowing the retrieval of said information supplementary for the DNS request through said interface by the deciding module; a collector module for collecting said information supplementary for the DNS request from different sources of information through a corresponding interface; and a database manager module for storing the collected information supplementary for the DNS request, said database manager having two different interfaces, a first one for communicating with the reporting module and a second one for communicating with the collector module.

The different sources of information comprise internal information to a service provider of the communication network and external information to said service provider. Preferably, the internal information come from Operations Support Systems (OSS)/Business Support Systems (BSS) at least including network topologies databases, inventories tools, monitoring network and flows and service graph orchestration, whereas the external information at least include security information, user's preferences and/or roaming information.

Embodiments of the present invention also provide a computed implemented method for automatically define forwarding rules to configure a computer networking device, for instance a switch, wherein a controller manager of a network controller, such as a SDN controller, connected to a sub-network of a communication network receives a request for a given service and defines, by executing an algorithm, forwarding rules related to said given service, and installs the defined forwarding rules into a computer networking device of the sub-network of the communication network in order to configure the computer networking device for the given service. Moreover, and characteristically of the present invention, a deciding module of the network controller which communicates with the controller manager, forwards a DNS request of said request for the given service to a DNS server in order the latter determining a resolution for the DNS request; and retrieves, after having received the determined resolution from the DNS server, information supplementary for the DNS request from a database. Consequently, the deciding module assists the controller manager in performing the definition of the forwarding rules.

According to the invention, before said retrieving of the information supplementary for the DNS request being performed, a collector module of the database collects the supplementary information from different sources of information and further stores the collected supplementary information in a database manager module of the database for allowing the retrieval by the deciding module.

In an embodiment, the request for the given service is performed by a user connected to the computer networking device by means of a computing device such as a Tablet, a PC, a notebook, a Smartphone, etc.

In another embodiment, the request for the given service is performed by a datacenter connected to the computer networking device.

Therefore, present invention automatically and proactively allows the configuration of forwarding rules on-demand in the provided SDN controller taking as input the DNS traffic as consequence of a request for a given service made by an end user, for instance, a request for a domain name resolution function, in order to identify in advance the flow that can be created by the end user before such flow enters the communication network.

In a communication/telecommunication network the end users access applications by relaying on DNS services, in order to get an IP address routable in the network from an URL specified by the user(s) when accessing a service (e.g. a web page or content).

Hence, with present invention it is possible to know in advance the flow that will pass through the communication network, and automatically prepare the communication network to handle it by configuring appropriate rules in the provided SDN controller.

Since the provided SDN controller allows a richer handling of the flow, the information kept in a separate database (queried in base to the DNS resolution) makes possible a fine-grain handling of the incoming flow (by incorporating supplementary information such as VLAN tag, MAC address, TCP/UDP ports, etc. or combination of them, that could be of interest for the domain for handling the expected incoming flows).

BRIEF DESCRIPTION OF THE DRAWINGS

The previous and other advantages and features will be more fully understood from the following detailed description of embodiments, with reference to the attached drawings, which must be considered in an illustrative and non-limiting manner, in which:

FIGS. 4, 5A and 5B are two different examples where present invention is of particular relevance.

DETAILED DESCRIPTION OF SEVERAL EMBODIMENTS

Figure 1:
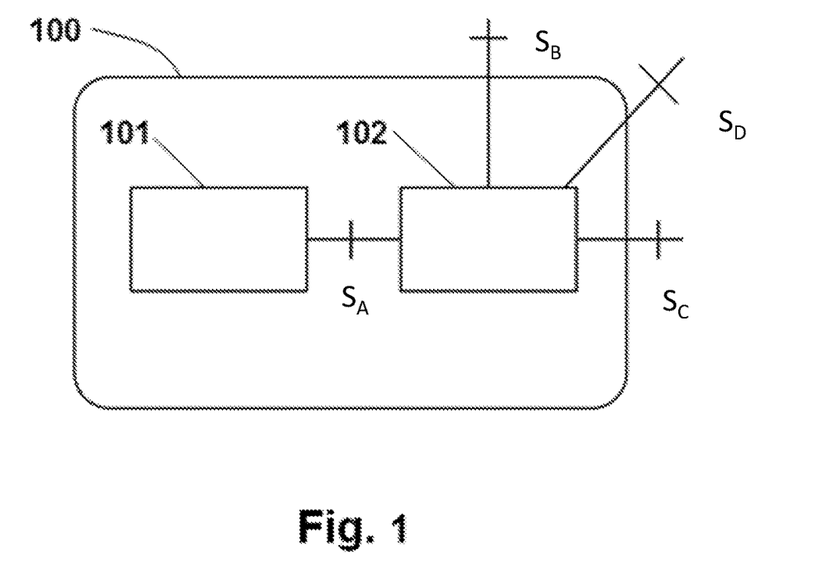
FIG. 1 is an illustration showing the structure and interfaces of the proposed network controller or SDN controller for automatically define forwarding rules to configure a computer networking device.

FIG. 1 illustrates the proposed network controller 100, or augmented SDN controller as will be call from now on. The augmented SDN controller 100 includes a conventional SDN controller module, in this description termed as controller manager 101, and is augmented by further including a deciding module 102 that interacts with a DNS server 150 and with a database 300.

The deciding module 300 is in charge of: forwarding a DNS request to the DNS server 150; receiving the answer from the DNS server 150; querying the database 300 for obtaining supplementary or fine-grain information for the DNS request; informing the controller manager 101 of a new flow entering the communication network; and forwarding to other deciding modules in the communication path that information for preparing their corresponding network segments. The information retrieved from the DNS server 150 could originate new forwarding rules or not, depending on the decision of the controller manager 101 (i.e. an entering flow could match an existing rule, then not producing any new flow rule).

The main interfaces of the augmented SDN controller 100 are:

- a interface $S_A$ used for the communication between the controller manager 101 and the deciding module 102. From the controller manager 101 this interface is used for forwarding the DNS requests from the end user 10 to the deciding module 102, in order to reach the DNS server 150. From the deciding module 102, this interface transports the information retrieved from the DNS server 150 in order to inform the controller manager 101 about the characteristics of an incoming flow to the communication network, in order to configure in advance the affected computer networking devices (for instance the switches) in its network domain (or sub-network);
- a interface $S_B$ used for the communication between the deciding module 102 and the DNS server 150. From the deciding module 102 this interface is used to forward the end user DNS request to the DNS server 150 and for requesting the details for the new flow entering the network. From the DNS sever 150 this interface is used to provide the domain name resolution;
- a interface $S_C$ used for the communication between the deciding module 102 in the augmented SDN controller of the end user's network domain and one or more deciding module(s) pertaining to other augmented SDN controller(s) 100 in other network domains in the end-to-end path for distributing the flow details used for setting up flow rules along the path. From the deciding module 102 in the end user's domain, this interface transports the flow details. From the deciding module(s) in other network domains in the path, this interface is used to acknowledge the information received; and
- a interface $S_D$ is used to query the database 300 which contains the fine-grain details for the flow that can be used to configure new rules on the network elements along the end-to-end path. From the augmented SDN Controller 100 this interface is used to obtain additional flow details useful in an SDN environment. From the database 300, this interface is used to deliver such information.

Figure 2:
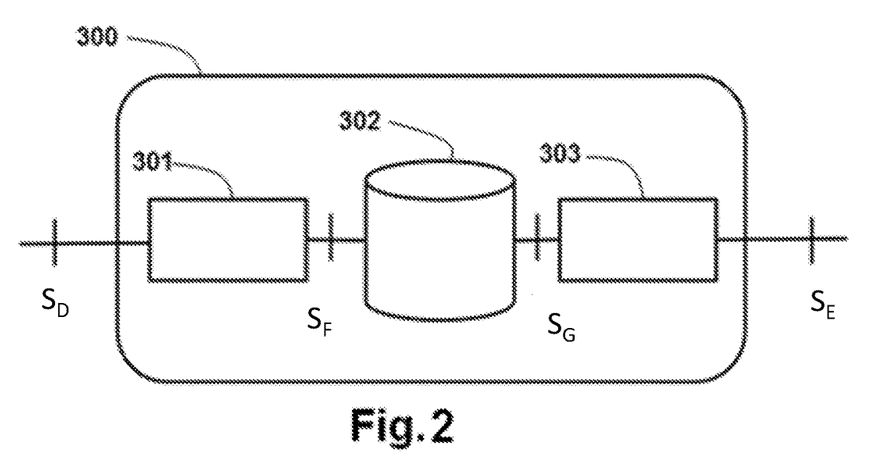
FIG. 2 is an illustration showing the database structure and interfaces.

FIG. 2 illustrates the proposed database structure and interfaces. The database 300 is the specific module in charge of collect and store relevant information of the service provider (or network owner) of the communication network to improve the information offered by the DNS server 150. Several sources of information can feed the database 300, like external Domains reputation lists, or Provider domains of interest to optimize the traffic, like own domains or client's domains. This information is retrieved by a collector module 303 and processed (including any analysis algorithms and relevant data extraction) and finally stored in a database manager module 302. The indexation of the database information is organized to combine DNS records data with topology and contextual information of the service provider, in this manner, reporting data to the augmented SDN controller 100 will optimize the process time and reduce the delay. This latter task is done by a reporting module 301 that will be able to deliver fine-grain flows information to construct rules and policies in the augmented SDN controller 100.

The interfaces of the database 300 are:
- a interface $S_E$ used for the communication with the different sources of information. This interface transports two different types of data: one internal to the service provider and one external. Preferably internal sources of data will come from OSS/BSS, including Network topologies database, Inventories Tools, Monitoring Network, Flows and service graph orchestration. External sources of data will preferably include security information, client's preferences or roaming information. All this data feed the collector module 303 with relevant information to adapt dynamically the communication network. This is the main source of information used by the collector module 303 to realize the analysis and subsequence storage;
- a interface $S_G$ that uses a normalized format to have a persistent storage of the information collected by the collector module 303 in the database manager module 302;
- a interface $S_F$ that allows the communication between the reporting module 301 and the database manager module 302. This interface interchanges information of queries and response to the database manager module 302. Moreover, in distributed models could also allow scalability and load balancing against several databases; and
- the previously describe interface $S_D$.

Figure 3:
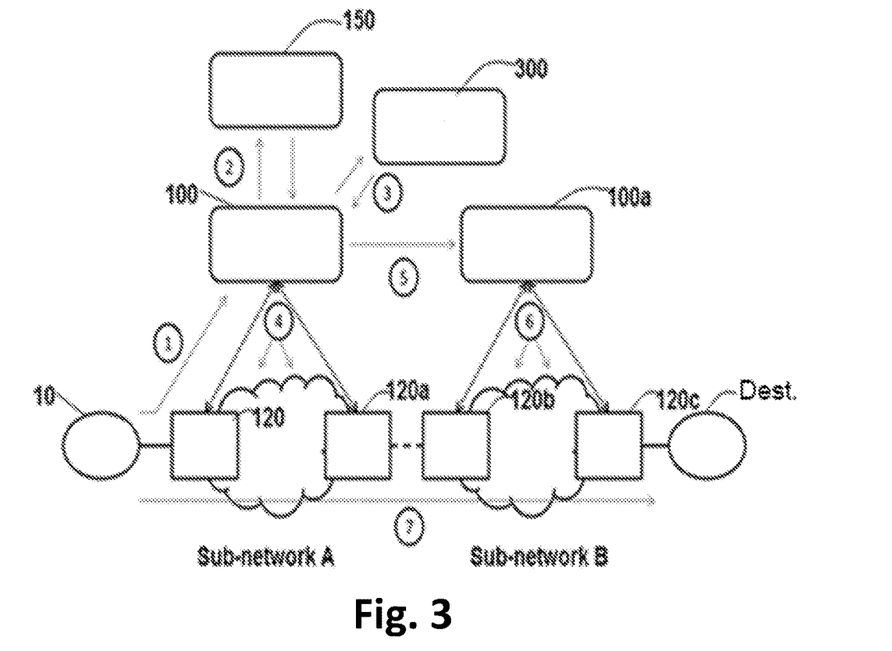
FIG. 3 illustrates the high level process performed by the present invention according to some embodiments.

With reference now to FIG. 3 it is illustrated an embodiment of the present invention. In this case, (1) when an end user 10 wants to perform a given service such as (s)he wants to retrieve some information from the Internet, e.g. a web page or media content, that is typically done by accessing such information by means of an URL, (s)he performs a request for said service that generates a packet for DNS resolution. Such packet is intercepted and identified as a DNS request by the controller manager 101 of the augmented SDN controller 100. The packet interception by the controller manager 101 could be possible for several reasons. For instance, the augmented SDN controller 100 can incorporate DNS proxy functionalities. Other possibility is that the DNS request reaches the augmented SDN controller 100 as a first packet of a flow without not configured flow handling entry in the flow table, or that there is a specific pre-configured flow entry in the flow table redirecting all the DNS requests to the augmented SDN controller 100.

Then, the deciding module 102 forwards (2) the end user request to the DNS server 150 for name resolution which determines the domain behind the URL and forwards the determined information to the deciding module 102. The determined name by the DNS server 150 may be forwarded to the end user 10, either directly by the DNS server 150, or by the augmented SDN controller 100 if it is acting as DNS proxy. In any case, the name resolution provided to the end user 10 is a conventional DNS resolution.

The deciding module 102, after receiving the information from the DNS sever 150, (3) queries the database 300 for retrieving the supplementary or fine-grained information for the DNS request (complemented with new fields) in order to prepare the communication network for the incoming flow. Finally, after the controller manager 101 processing, by executing an algorithm, the determined information provided by the DNS server 150 and the fine-grained information retrieved from the database 300, the controller manager 101 sets up (4) the required forwarding entries in the flow tables of the computer networking device 120a, in this particular embodiment a switch, in its domain or sub-network A, if necessary.

The augmented SDN controller 100 (in particular the deciding module 102 of the augmented SDN controller 100) may also transfer (5) the relevant information about the incoming flow to other augmented SDN controllers 100a (to other deciding modules) in the end-to-end path where other end user(s) 20 may be connected. This can be done for instance based on a northbound interface with an orchestrator to assists them for preparing the corresponding network segments for the incoming traffic. Therefore, others augmented SDN controllers 100a in other network domains B of the communication network can preconfigure (6) the involved switches 120b, 120c in the end-to-end path, if needed, according to the information received by the augmented SDN controller 100 of the network domain A of the end user 10.

Finally the end user flow (7) towards the desired destination passes through the communication network without triggering any reactive flow rule configuration.

Next are detailed two different examples in which present invention is of particular relevance. It has to be noted that each of following examples has entity as a whole by themselves because are specific applications of the invention, but also can be understood as a mechanism to define the path and the order between communication network nodes that offer service functions in what is known as Service Function Chaining (SFC), i.e. the abstracted view of the required service functions and the order in which they are to be applied (Detail description is available in IETF WG SFC [7]).

Figure 4:
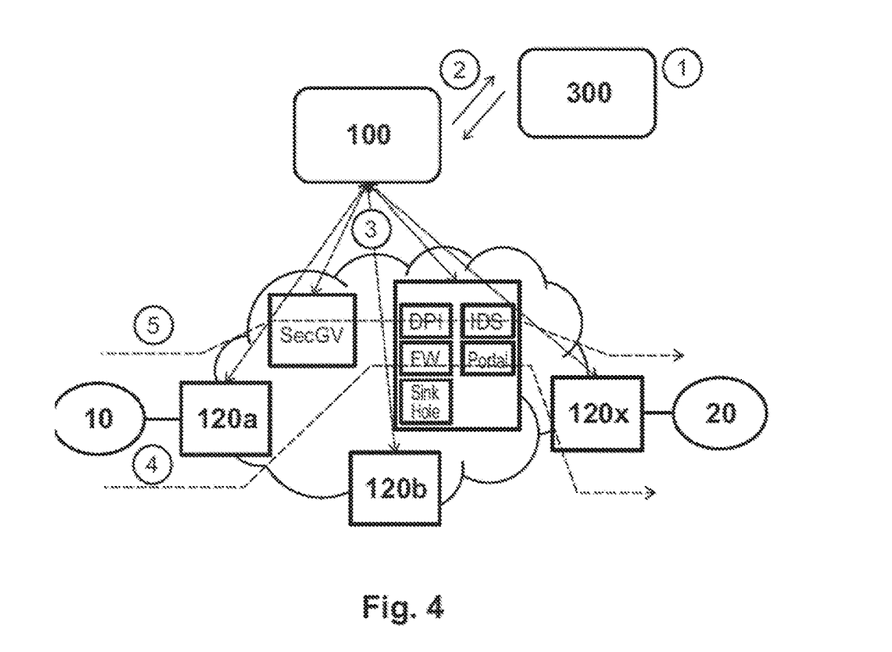
FIG. 4 is a security application example and FIGS. 5A and 5B are a virtual datacenter example in a cloud computing infrastructure.

With reference to FIG. 4 it is illustrated a first example for a security system, for instance for a Malware protection system that could detect and treat malicious traffic. In particular, this security system will include in the database 300 the relevant information about security based in the DNS information. Different kind of information could it be added:

I. Blacklist domains, including known malicious content domains for spam, phishing, malware download, Botnets controllers command & control;

II. Abnormal DNS traffic behavioral, some examples are excessive and DNS queries rate per origin (MAC address it will the best unique origin identification, but not the only one) that identify a bot based in Domain generation algorithm (DGA) or a massive MX type queries that indicate SPAM traffic generation;

III. Rare domains names, that include unintelligible or with no sense words, automatic generated and used for malware hosting.

All these information does not form part of the invention, and can be obtained from the external sources or internally detected and stored in the database manager module 302.

Security data related with domains is included (1) in the database 300, so whenever the augmented SDN Controller 100 receives a device or a user DNS traffic flow, it will request (2) to the database 300 the supplemented security information around the domain request. When the information retrieved from the database 300 confirms a security risk (malware related presence in the Domain), the augmented SDN controller 100 can execute (3) different actions based on the supplementary information. Therefore, the augmented SDN controller 100 can redirect in advance (4) all the traffic from that source to a specific network zone to treat the traffic (sinkhole sensors, user remediation captive portal, etc.), cleaning the traffic in the network, and protecting the source.

Another additional flavor of application case for this security embodiment is a security traffic steering based in pre-programmed information. In this case the database 300 includes (1) a sensitive information like a list of sensitive domains or a list of source IP addresses that must be treat different from the point of view of security (Banks online service, business transactional services, companies VPN access, etc.). The service provider or even the users can define these domains and include it in the database 300. The augmented SDN controller 100, based in the received supplementary (2) information from the database 300 will prepare (3) the network with different actions: redirect access traffic coming into network from user to secure entry points (SecGW for 3G or 4G mobiles access, or VPN terminator, etc.) if the physical access is not secure; and redirect (5) the traffic towards to destination to devices or networks domains that will that will in charge of inspect (DPI, IDS) and supervise the traffic from the security point of view. Therefore, present invention allows the combination of the SDN capabilities and DNS information to prepare and optimize the traffic redirection avoiding complex techniques (routing protocols, filter policies, etc.).

It has to be noted that SecGW is defined in 3GPP TS 33.210 [5] in a general model to connect two non-secure domains, but in 3GPP TS 33.401 Section 11, [6] is applied to LTE mobile in order to protect physical access between eNB, MME and S-GW.

Figure 5A:
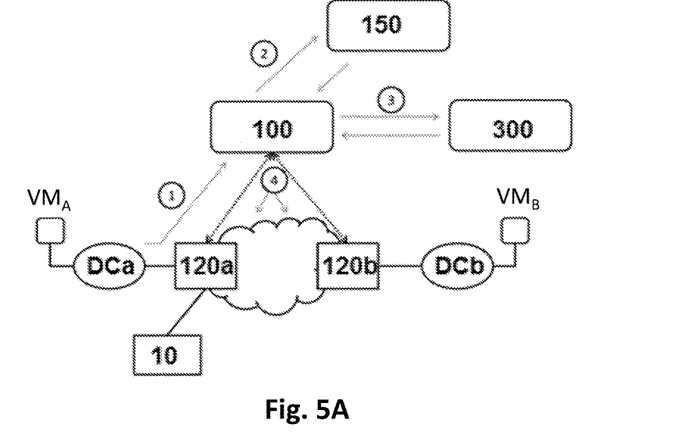
Figure 5B:
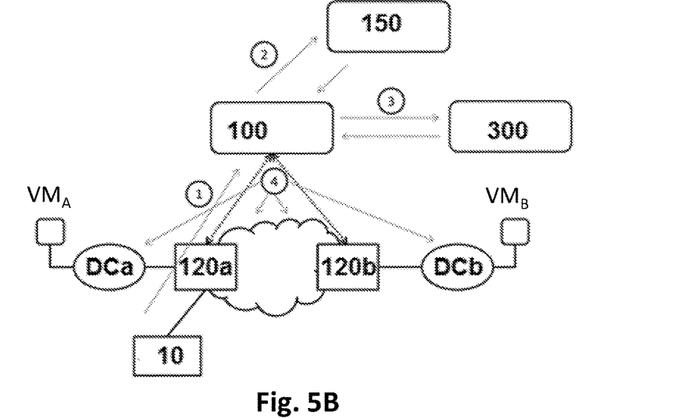

FIGS. 5A and 5B illustrate a second example for a virtual data center in a generic cloud computing infrastructure (public, private and/or hybrid). Cloud Computing allows the sharing of the physical infrastructure in a multi-tenant fashion, thanks to the virtualization capabilities of existing operative systems and IT technologies in general. The resources allocated to one user can be assigned in different datacenters and even change in time, without impact for the end user. There are several commercial offers based on cloud infrastructures where users of these systems are allowed to deploy virtual machines $VM_A$, $VM_B$ in separated datacenters $DC_a$, $DC_b$. These Virtual Machines $VM_A$, $VM_B$ are intended to provide services, either internal or external to the end-user network. Because of the flexibility provided by these systems, the virtual machines $VM_A$, $VM_B$ can be migrated between datacenters $DC_a$, $DC_b$ without further impact.

The most common and easy access to a given service running on a virtual machine $VM_A$ will be via a DNS query, in order to hide the specific IP of the virtual machine $VM_A$. Then, as a common way of procedure, the virtual datacenter $DC_a$ will deploy a DNS service where the resolution among the virtual machine naming and the corresponding IP is given, both for internal and external communication purposes. Furthermore these cloud environments start to be integrated with SDN-based solutions for connectivity provision. The SDN capabilities can be extended further than the datacenter limits, including also the connections in a WAN, for a smooth end to end connectivity solution.

In this situation, the proposed invention becomes beneficial because of the combination of both SDN and DNS for setting up in advance the required transport links in the virtual datacenter $DC_a$ environment. Even more, this connectivity can be re-adapted according to the allocation of new resources in a different datacenter $DC_b$ as in the virtual machine mobility case. Whatever new communications to a virtual machine $VM_A$ that needs a DNS query in an SDN environment will allow identify in advance the flows that will cross both datacenter $DC_a$ and WAN network.

Thanks to Network Functions Virtualization (NFV) technologies, it becomes possible to instantiate virtual network functions (VNFs) in datacenter computing resources. In consequence the embodiment presented here can be used as a mechanism to define service function chaining between such VNFs.

The scope of the present invention is determined by the claims that follow.

The invention claimed is:

1. A network controller for automatically define forwarding rules to configure a computer networking device, whereby said network controller is connected to a sub-network of a communication network and comprises:
   a controller manager that receives a request for a given service and defines, by executing an algorithm, forwarding rules related to said service and installs the defined forwarding rules into a computer networking device of the sub-network of the communication network in order to configure the computer networking device for said given service,
characterized in that the network controller further comprises:
   a deciding module configured to communicate with the controller manager and configured to interact with a DNS server to receive a determined resolution for a DNS request of said request for said given service, and with a database to retrieve information supplementary for the DNS request, in order to assist the controller manager in performing the defining of the forwarding rules; and
   a plurality of interfaces for allowing the communication of the deciding module with the controller manager, the DNS server and the database.

2. The device of claim 1, wherein the controller manager is connected to at least another computer networking device of said sub-network of the communication network in order to install the defined forwarding rules in said another computer networking device.

3. The device of claim 1, wherein the first network controller is connected to at least a second network controller of a sub-network of the communication network adjacent to the sub-network in order the deciding module of the first network controller sending, through a corresponding interface, the determined resolution received from the DNS server and retrieved from the database to at least another deciding module included in said second network controller.

4. The device of claim 1, wherein said database comprises:
   a reporting module for allowing the retrieval of said information supplementary for the DNS request through said interface by the deciding module;
   a collector module for collecting said information supplementary for the DNS request from different sources of information through a corresponding interface; and
   a database manager module for storing the collected information supplementary for the DNS request, said database manager having two different interfaces, a first one for communicating with the reporting module and a second one for communicating with the collector module.

5. The device of claim 4, wherein the different sources of information comprises internal information to a service provider of the communication network and external information to said service provider, wherein the internal information come from Operations Support Systems or OSS/Business Support Systems or BSS at least including network topologies databases, inventories tools, monitoring network and flows and service graph orchestration; and the external information at least include security information, user's preferences and/or roaming information.

6. The device of claim 1, wherein the computer networking device comprises a switch.

7. The network controller of claim 1, wherein the controller manager complies with Control to Data-Plane Interface, or CDPI, specifications.

8. A computed implemented method for automatically define forwarding rules to configure a computer networking device, the method comprising:
   receiving, by a controller manager of a network controller connected to a sub-network of a communication network, a request for a given service; and
   defining, by said controller manager, by executing an algorithm, forwarding rules related to said given service, and installing the defined forwarding rules into a computer networking device of the sub-network of the communication network in order to configure the computer networking device for the given service,
characterized in that the method comprises:
   forwarding, by a deciding module of the network controller in communication with the controller manager, a DNS request of said request for the given service to a DNS server, the latter determining a resolution for the DNS request and further forwarding the determined resolution to the deciding module; and
   retrieving, by the deciding module, after receiving the determined resolution from the DNS server, information supplementary for the DNS request from a database, so that the deciding module assists the controller manager in performing the definition of the forwarding rules.

9. The method of claim 8, further comprising installing, by the controller manager, the defined forwarding rules into at least another computer networking device of said sub-network of the communication network.

10. The method of previous claim 8, further comprising sending, by the deciding module, the determined resolution received from the DNS server and the retrieved supplementary information from the database to at least another deciding module included in another network controller of a sub-network of the communication network adjacent to the sub-network.

11. The method of claim 10, wherein, before said retrieving of the information supplementary for the DNS request being performed, a collector module of the database comprises collecting the supplementary information from different sources of information and further storing the collected supplementary information in a database manager module of the database for allowing the retrieval.

12. The method of claim 11, wherein the different sources of information comprises internal information to a service provider of the communication network and external information to said service provider, wherein the internal information come from Operations Support Systems or OSS/Business Support Systems or BSS at least including network topologies databases, inventories tools, monitoring network and flows and service graph orchestration; and the external information at least include security information, user's preferences and/or roaming information.

13. The method of claim 8, wherein, before said retrieving of the information supplementary for the DNS request being performed, a service provider of the communication network comprises storing the supplementary information in a database manager module of the database for allowing the retrieval.

14. The method of claim 8, wherein the request for the given service is performed by a user connected to the computer networking device by means of a computing device.

15. The method of claim 8, wherein the request for the given service is performed by at least one datacenter connected to the computer networking device.

* * * * *